United States Patent [19]

Townsend

[11] 4,207,474
[45] Jun. 10, 1980

[54] SEQUENTIAL TWO TONE DETECTOR

[75] Inventor: Greg M. Townsend, Rolling Meadows, Ill.

[73] Assignee: Motorola, Inc., Schaumburg, Ill.

[21] Appl. No.: 927,267

[22] Filed: Jul. 21, 1978

[51] Int. Cl.² ............................................ H04Q 9/12
[52] U.S. Cl. .................................. 307/40; 340/171 PF
[58] Field of Search ................. 340/163, 150, 171 A, 340/171 PF, 147, 171 R, 164 R; 307/38, 34, 35, 126, 52, 40

[56] References Cited

U.S. PATENT DOCUMENTS

| | | | |
|---|---|---|---|
| Re. 28,739 | 3/1976 | Wycoff | 340/171 PF X |
| 3,355,709 | 11/1967 | Hanus | 340/171 R X |
| 3,396,370 | 8/1968 | Agnew | 340/163 |
| 3,465,294 | 9/1969 | Carsello et al. | 340/164 R X |
| 3,581,283 | 5/1971 | Reddel | 340/171 PF |
| 4,069,477 | 1/1978 | Maben | 340/171 PF X |

*Primary Examiner*—L. T. Hix
*Assistant Examiner*—James L. Dwyer
*Attorney, Agent, or Firm*—James P. Hamley; Rolland R. Hackbart; James W. Gillman

[57] ABSTRACT

A power management central controller is operable to transmit a sequential two tone load shed command to a plurality of power loads should power consumption become excessive. An improved detector at the load site detects the presence of the two tone signal and initiates the load shedding interval.

7 Claims, 3 Drawing Figures

SEQUENTIAL TWO TONE DETECTOR

BACKGROUND OF THE INVENTION

The present invention pertains to the signal control art and, more particularly, to a two tone sequential detector which finds particular application in the electrical power management art.

Detectors for determining the presence of control signals are well known in the communication art, and, in the preferred embodiment of the instant invention, find particular application in power management systems. In such utility load management systems, a central controller monitors electrical power being consumed by a plurality of load sites. During periods of peak power consumption it is desirable to disconnect, or "shed" certain deferable loads from the system. This is accomplished by providing at the load sites means to interrupt power to deferable loads, such as water heaters or air conditioners, for a given time interval. A command signal is transmitted by the central controller indicating the need to shed loads. This signal is received by a receiver at the remote site, detected, thereafter activating a timer which "times out" the load for a given time interval.

The command signal according to the preferred embodiment of the invention is of the two tone sequential type, i.e. a tone of a first frequency followed immediately by a tone of a second frequency. The detector at the load site must identify the two tone sequence in order to initiate the load shed interval.

Two tone sequential detectors are well known, particularly in the communication signalling art. Such prior art detectors indicate the presence of the two tone command signal if both of the following criteria are satisfied. First, the initial tone must be present for some predetermined time interval. Secondly, the second tone must be present for a given time interval following conclusion of the first tone. A fundamental problem with the prior art two tone detectors has been their susceptibility to falsing. Given the above criteria, it is evident that falsing might occur, for example, under various noise conditions. Thus, there is a need in the two tone signalling art to provide a high security detector.

In addition, in some applications it is desirable to control one of two functions based upon the order in which the two tones are set. Thus, here it is desirable to provide a high security two tone detector which conveniently and inexpensively can detect the sequence of incoming tones to thereby control appropriate output functions.

SUMMARY OF THE INVENTION

It is an object of the invention, therefore, to provide a high security method and means for determining the presence of a two tone command signal.

It is a further object of the invention to provide the above described high security system further comprising a method and means for determining the ordered sequence of the input tones to thereby control corresponding output functions.

Briefly, according to the invention, a method is described for detecting the presence of a first frequency signal followed by a second frequency signal. The steps of this method include first determining that the first frequency signal is present for a predetermined minimum time interval. Second, a determination is made that the second frequency signal begins within a predetermined time interval referenced to the conclusion of the first frequency signal. Finally, it is determined that the second frequency signal is present for a predetermined minimum time interval following the conclusion of the first frequency signal. Thus, a high security two tone detection method is accomplished.

Wherein the first frequency signal is one of the signals A and B and the second frequency signal is the other of the signals A and B, a method is further described for detecting the tone sequence and thereby activating a first output in response to a A-B sequence and a second output in response to a B-A sequence.

Corresponding apparatus is described which performs the above methods.

DETAILED DESCRIPTION OF THE PREFERRED EMBODIMENT OF THE INVENTION

Figure 1:
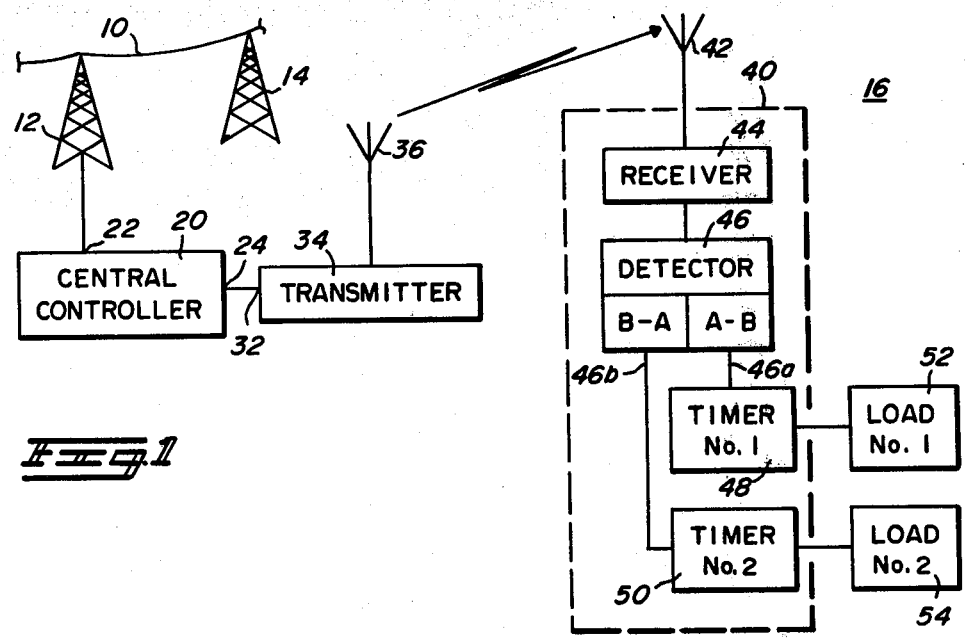
FIG. 1 is a generalized block diagram of a power management system which incorporates the preferred embodiment of the two tone detector.

FIG. 1 is a generalized block diagram of a power management system. Here, a power line 10, supported by towers 12, 14, carries power to a series of load sites, one such site being indicated generally at 16. A central controller 20 monitors power on the line 10 at an input 22. The central controller 20, variations of which are well known in the prior art, includes means to compare the peak power on the power line 10 with reference levels and determine whether or not power consumption by the loads exceeds certain limits. If a limit is exceeded, the central controller generates a command signal at its output line 24. This command signal is coupled to the input 32 of a radio frequency transmitter 34. Upon recieving the command signal, the transmitter modulates the generated carrier therewith, broadcasting the command over an antenna 36.

The load shed command signals are received at the various load sites. Here, for illustrative purposes, the signal is shown coupled to the antenna 42 of a load site controller 40 which is operable to control either of two loads 52, 54. The signal received by the antenna 42 is routed to a load site receiver 44, which, in the conventional manner, recovers the command signal. The presence of the command signal is detected by an improved detector 46, which, should a proper command be received, activates a proper one of the associated timers 48, 50. Upon a timer 48, 50 being activated, its corresponding load is disconnected, or shed from the power line 10 for a time interval as determined by the timers 48, 50.

In the preferred of the instant invention, the command signal generated by the central controller 20 is a two tone sequential signal. That is, two predetermined frequency signals A, B are sequentially transmitted. The order in which the two tones are transmitted, that is either in an A-B or B-A sequence, determines which of the loads 52, 54 the central controller wants shed.

The inventive detector 46 processes the output from the receiver 44 to determine whether or not a proper two tone sequence is being received and also to activate an appropriate one of its outputs 46a, 46b depending upon whether the command signal is of the A-B or B-A sequence.

Detector 46 detects the presence of a two tone command signal if and only if the following three criteria are satisfied. Firstly, the first tone signal must be present for a predetermined minimum time interval. Secondly, the second tone signal must begin within a predetermined time interval referenced to the conclusion of the first tone signal. Finally, the second tone signal must be present for a predetermined minimum time interval following the conclusion of the first frequency signal. If all of these criteria are satisfied, detector 46 then determines whether the sequence is of the A-B or B-A type and activates the one of its outputs 46a, 46b corresponding thereto. This initiates, through the timers 48, 50, the load shedding interval of either load 52 or load 54.

Figure 2:
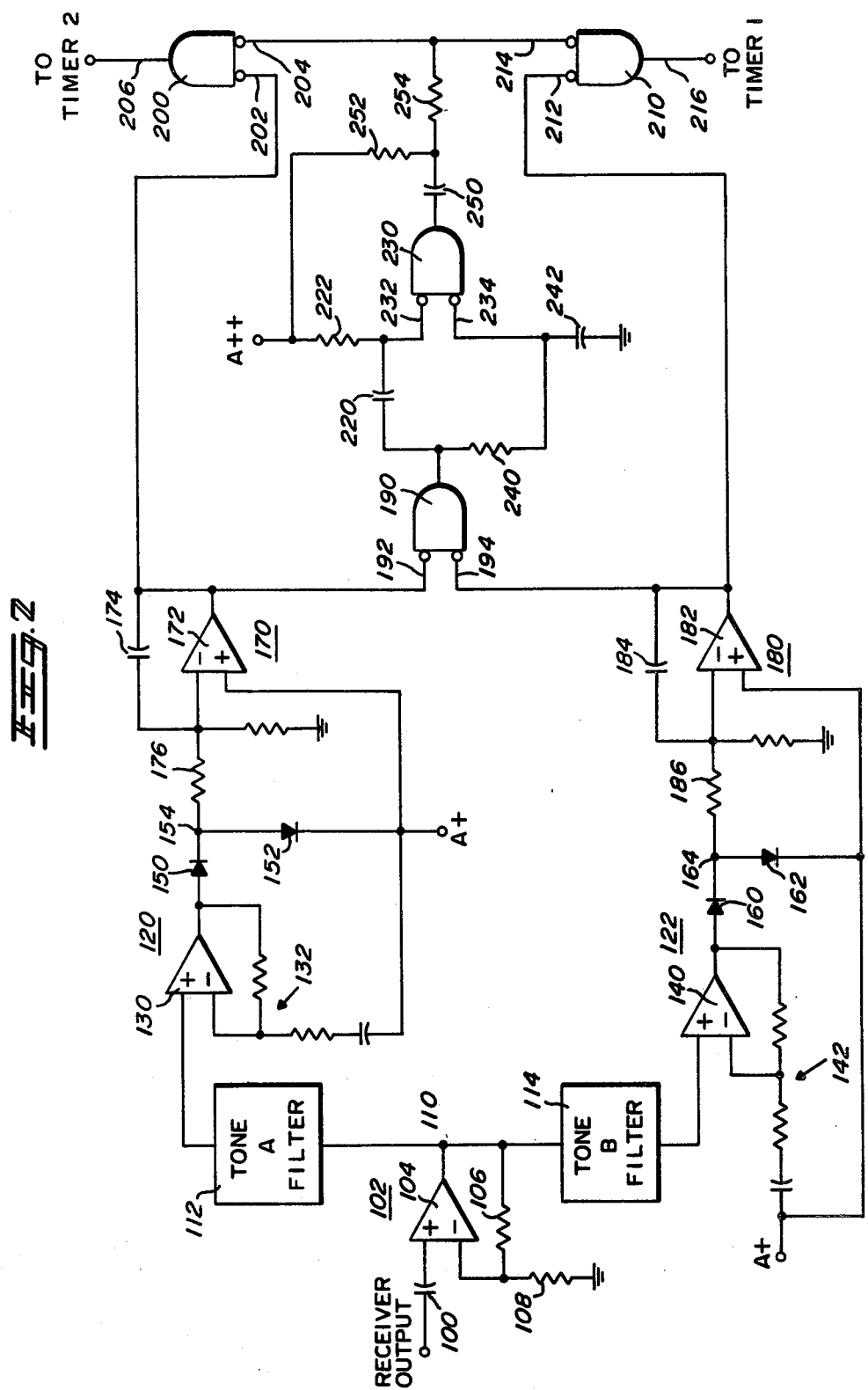
FIG. 2 is a detailed schematic diagram of a preferred embodiment of the two detector.

FIG. 2 is a detailed schematic diagram of the preferred embodiment of the improved detector according to the invention. Here, the output from a receiver (such as receiver 44 in FIG. 1) is coupled through coupling capacitor 100 to a conventional amplifying stage 102 comprised of operational amplifier 104 and feedback resistors 106, 108. The amplified receiver output appears at the amplifier 102 output 110 where it is coupled to first and second tone filters 112, 114 respectively. The first tone filter 112 is tuned to a predetermined frequency A, whereas the second tone filter 114 is tuned to a predetermined frequency B. The tone filters 112, 114 may be comprised of conventional L-R-C components or of any of a number of tuning elements, such as vibrating reeds.

The output from the tone filters 112, 114 are buffered and amplified in conventional amplifiers 120, 122, respectively. Each amplifier 120, 122 is comprised of an operational amplifier 130, 140 and corresponding gain determining feedback components 132, 142, respectfully.

The amplified tones are then rectified and limited by diodes 150, 152 for tone A and 160, 162 for tone B. In the conventional manner, the diodes 150, 152 and 160, 162 produce at their common connections 154, 164 a halfwave rectified signal having a level proportional to the AC tone level out of the amplifier stages 120, 122, respectively.

These DC voltages are integrated in conventional integrator stages 170, 180, respectively. The integrator stages are comprised of operational amplifiers 172, 182, integrating capacitors 174, 184 and integrating resistors 176, 186.

The output from the integrator stages 170, 180 are coupled to the inputs 192, 194 of a NOR gate 190. Also, the output from each integrator 170, 180 is connected an input 202, 212 of function control NOR gates 200, 210.

The output from NOR gate 190 is coupled via a differentiating capacitor 220 and resistor 222 to the first input 232 of a NOR gate 230. Also, the output of NOR gate 190 is coupled through an integrating resistor 240 and capacitor 242 to the second input 234 of NOR gate 230. The output from NOR gate 230 is coupled through differentiating capacitor 250 and resistors 252, 254 to the second inputs 204, 214 of NOR gates 200, 210, respectively.

The outputs 206, 216 from NOR gates 200, 210 comprise the outputs of the detector, and are utilized to initiate the load shed sequence by activation of corresponding timers, such as timers 52, 54 of FIG. 1.

Figure 3:
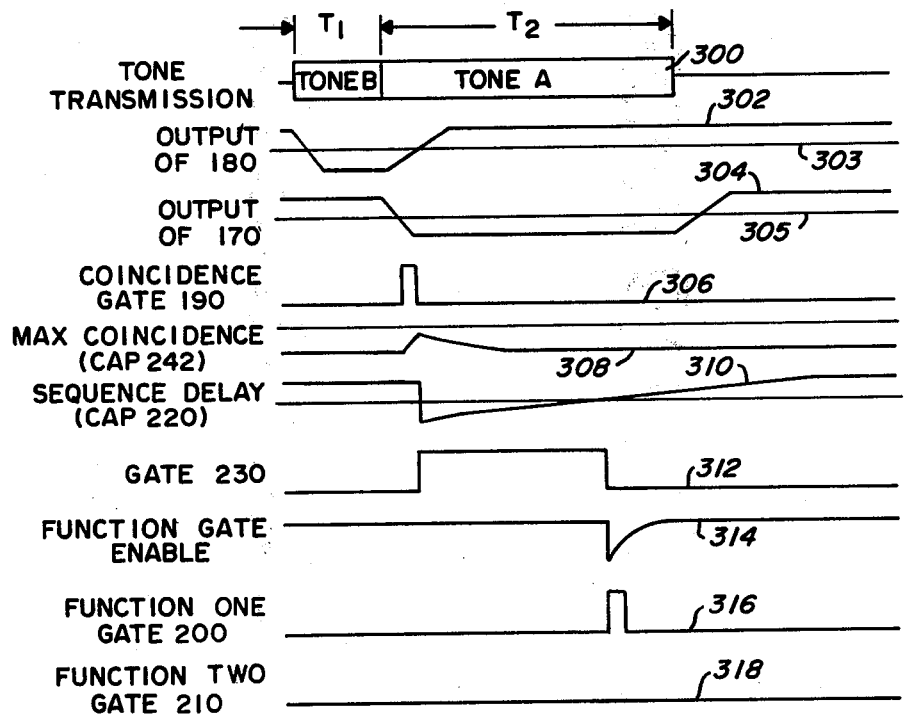
FIG. 3 is a series of waveforms illustrating operation of the circuit shown in FIG. 2.

Operation of the circuit of FIG. 2 may be better understood with reference to FIG. 3, which illustrates representative waveforms occurring during operation of the circuit shown in FIG. 2.

It is assumed for the present example that the command signal from the central controller is of the sequence B-A, thereby indicating desired shedding of the second load, 54 (FIG. 1). The two tone sequence is thus illustrated in waveform 300 wherein the tone B is transmitted for a total duration $T_1$ and the tone A is transmitted for a total duration $T_2$. The tone B is selected by filter 114, amplified by amplifier 140 and rectified and limited by diodes 160, 164 resulting in a DC level. This DC level is integrated by integrator 180, thereby producing waveform 302. In a similar manner, the tone of frequency A is selected by tone filter 112, amplified in amplifier 120 and rectified and limited to a corresponding DC level via diodes 150, 152. This DC level is integrated by integrator 170, thus producing waveform 304.

Gate 190 acts as a coincidence gate, producing a high output only when both of its inputs 192, 194 are at a low level. For purposes of the instant discussion, a low level corresponds to a voltage less than the mid-point voltages 303, 305. The output from coincidence gate 190 is shown as waveform 306.

The output from coincidence gate 190 is integrated, via integrating capacitor 242 and its associated resistor 240, thereby producing waveform 308. Also, the output from coincidence gate 190 is differentiated, via differentiating capacitor 220 and its associated resistor 222, thereby producing waveform 310.

The coincidence of the waveforms 308, 310 is indicated by gate 230, whose output is shown in waveform 312. The trailing edge of waveform 312 is differentiated by capacitor 250 and its associated resistor 252, 254 producing waveform 314. Finally, the coincidence of the waveform 314 with the signals appearing at the inputs 202, 212 of gates 200, 210 results in the waveforms 316, 318 appearing at the output of gates 200, 210, respectively.

In one embodiment of the invention, the total time duration of tone B, i.e. $T_1$, is equal to 200 milliseconds while that of tone A, i.e. $T_2$ is equal to 800 milliseconds. The circuit of FIG. 2 is designed to insure that a detect condition is not indicated unless all of the following criteria are satisfied:

(1) the first received tone, and preferably both tones, must be present for at least 150 milliseconds;

(2) the second received tone must begin within a 300 millisecond time interval referenced to the conclusion of the first tone; and (3) the second tone must be present for 550 milliseconds following the conclusion of the first tone.

The condition that each tone be present for a minimum time interval, e.g. 150 milliseconds, is established in the embodiment of FIG. 2 by selecting the integrating times of integrators 170, 180. Referring to FIG. 3, it will be observed that the detect condition cannot occur unless there is an occurrence of coincidence in gate 190. Gate 190, however, cannot indicate coincidence unless both these signals at the output of integrators 170 and 180 fall below the reference level shown by reference lines 303, 305. Thus, by proper choice of the integrator time constants, it can be assured that the waveforms 302, 304 will not drop below the levels 303, 305 unless the total duration of each of the tones is at least 150 milliseconds.

Operation of the circuit to insure that detection can only be indicated if the second tone occurs within a predetermined time interval, e.g. 300 milliseconds, referenced to the conclusion of the first tone is as follows.

The time constants in the circuit are such that if the second tone does not occur before the end of the aforementioned 300 millisecond time interval, coincidence will not exist at gate 190. If the second tone occurs prior to the 300 millisecond interval (e.g. tone A and tone B may actually overlap), the coincidence signal of gate 190 exceeds the maximum coincidence time determined by resistor 240 and capacitor 242. In such an event, the voltage across capacitor 242 reaches a logic high level thereby locking gate 230 at a low level and inhibiting further decoding.

Finally, operation of the circuitry to indicate detection only if the second tone is present for a predetermined minimum time interval, e.g. 550 milliseconds, following the conclusion of the first tone is understood as follows.

The sequence delay time (waveform 310 of FIG. 3) as determined by resistor 222 and capacitor 220 is initiated following the conclusion of the first tone and after the waveform 306 from the coincidence gate 190 returns to a logical zero state. The function gate enable pulse (waveform 314 of FIG. 3) occurs after this sequence delay time, which delay time is selected to be 550 milliseconds.

If the signal is to be detected, the second tone must still be present at the time the function gate enable pusle 314 occurs.

In addition, it can be seen that the preferred embodiment of the invention is capable of determining whether the tone sequence A-B or B-A is present and activate a suitable output in response thereto. Referring to FIG. 3, it is seen that waveform 314, the function gate enable, produces a low level pulse following the conclusion of the sequence delay (as represented by waveform 310), during the occurrence of tone A (represented by waveform 304). Thus, by detecting the coincidence of a low function gate enable pulse 314 and a low tone state 302 or 304, a determination may be made as to whether the control signal present is of a sequence A-B or B-A. By the use of simple coincidence gates, such as gates 200, 210 an appropriate output can then be activated corresponding to the detected sequence.

In summary, an improved, high security two tone detector has been described.

While the preferred embodiment of the invention has been described in detail, it should be apparent that many modifications and variations thereto are possible, all of which fall within the true spirit and scope of the invention.

I claim:

1. A method for detecting the presence of a first frequency signal followed by a second frequency signal comprising the steps of:
   (a) determining that the first frequency signal is present for a predetermined minimum time interval, and providing a first indication signal when the first signal is determined to be present;
   (b) determining that the second frequency signal is present for a predetermined minimun time interval, and providing a second indication signal when the second frequency signal is determined to be present;
   (c) continuing to provide the first indication signal for a predetermined time interval after the conclusion of the first frequency signal;
   (d) determining that the first and second indication signals are coincidentally present for at most a predetermined maximum time interval, and providing a coincidence signal when both the first and second indication signals are coincidentally present; and
   (e) providing an output signal indicating that the first frequency signal and the second frequency signal have been detected if the second indication signal is present for a predetermined minimum time interval after the conclusion of the coincidence signal.

2. The method of claim 1 wherein the first frequency signal is one of the signals A and B and the second frequency signal is the other of the signals A and B, the method further comprising the steps of:
   (f) activating a first output signal responsive to the signal A being the first frequency signal and the signal B being the second frequency signal; and
   (g) activating a second output signal responsive to the signal B being the first frequency signal and the signal A being the second frequency signal.

3. In a tone signalling system wherein in a receiving site responds to a sequential two tone control signal to perform a desired function, an improved detector for detecting the presence of the two tone signal comprising:

means for detecting the first tone of the two tone signal and providing a first indication signal if the detected first tone is present for a predetermined minimum time interval;
   means for detecting the second tone of the two tone signal and providing a second indication signal if the detected second tone is present for a minium time interval;
   means for continuing to provide the first indication signal for a predetermined time interval after the conclusion of the first tone;
   means for providing a coincidence signal when the first and second indication signals are coincidentally present; and
   means for providing an output signal if the second indication signal is present for a predetermined minimum time interval after the conclusion of the coincidence signal.

4. The improved detector of claim 3 wherein the two tone control signal is comprised of tones of frequencies A and B and wherein a command signal of A-B represents desired performance of a first function and a command signal of B-A represents desired performance of a second function, the improved detector further comprising:
   means for activating a first output signal, corresponding to the first function, responsive to the sequence A-B being received; and
   means for activating a second output signal, corresponding to the second function, responsive to the sequence B-A being received.

5. The improved detector of claim 3 further including means for preventing the detector output signal when the first and second indication signals are coincidentally present for a time interval greater than a predetermined maximum time interval.

6. The improved detector of claim 4 or 5 for use in a power management system wherein a central controller monitors power consumed by a plurality of loads and is operable to generate a sequential two tone load shedding command responsive to excessive power consumption by said loads, said detector being responsive to the presence of said command to initiate the load shedding function.

7. The improved detector of claim 6 wherein the central controller is operable to produce a first command signal comprised of a tone A followed by a tone B indicative of required shedding of a first load and a second command signal comprised of tone B followed by tone A indicative of required shedding of a second load, the improved detector further comprising:

means for initiating shedding of the first load responsive to the presence of the first command signal; and means for initiating shedding of the second load responsive to the presence of the second command signal.

* * * * *

UNITED STATES PATENT AND TRADEMARK OFFICE
CERTIFICATE OF CORRECTION

PATENT NO. : 4,207,474
DATED : June 10, 1980
INVENTOR(S) : Greg M. Townsend

It is certified that error appears in the above-identified patent and that said Letters Patent are hereby corrected as shown below:

Column 2, line 22, insert "tone" before -- detector --.

Column 2, line 60, insert "embodiment" after -- preferred --.

Column 3, line 39, "respectfully" should be -- respectively --.

Column 3, line 54, insert "to" after -- connected --.

Column 5, line 64, "minimun" should be -- minimum --.

Column 6, line 36, "minium" should be -- minimum --.

Signed and Sealed this

Thirtieth Day of September 1980

[SEAL]

Attest:

SIDNEY A. DIAMOND

Attesting Officer

Commissioner of Patents and Trademarks